(12) United States Patent
Jung et al.

(10) Patent No.: US 10,136,110 B2
(45) Date of Patent: Nov. 20, 2018

(54) LOW-LIGHT IMAGE QUALITY ENHANCEMENT METHOD FOR IMAGE PROCESSING DEVICE AND METHOD OF OPERATING IMAGE PROCESSING SYSTEM PERFORMING THE METHOD

(71) Applicant: SAMSUNG ELECTRONICS CO., LTD., Suwon-si, Gyeonggi-do (KR)

(72) Inventors: Yong Ju Jung, Daejeon (KR); Kwang Hyuk Bae, Seoul (KR); Chae Sung Kim, Seoul (KR); Joon Seo Yim, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 44 days.

(21) Appl. No.: 15/292,178

(22) Filed: Oct. 13, 2016

(65) Prior Publication Data

US 2017/0118450 A1    Apr. 27, 2017

(30) Foreign Application Priority Data

Oct. 21, 2015    (KR) .................. 10-2015-0146914

(51) Int. Cl.
| | | |
|---|---|---|
| H04N 5/225 | (2006.01) | |
| H04N 5/228 | (2006.01) | |
| H04N 9/09 | (2006.01) | |
| H04N 5/232 | (2006.01) | |
| H04N 5/235 | (2006.01) | |
| H04N 9/64 | (2006.01) | |
| H04N 9/04 | (2006.01) | |

(52) U.S. Cl.
CPC ............. *H04N 9/09* (2013.01); *H04N 5/2258* (2013.01); *H04N 5/2351* (2013.01); *H04N 5/23229* (2013.01); *H04N 5/23245* (2013.01); *H04N 9/045* (2013.01); *H04N 9/646* (2013.01)

(58) Field of Classification Search
CPC ............... H04N 5/2258; H04N 5/2351; H04N 5/23245; H04N 5/23229; H04N 9/09; H04N 9/045; H04N 9/646
See application file for complete search history.

(56) References Cited

U.S. PATENT DOCUMENTS

| | | | |
|---|---|---|---|
| 8,115,825 | B2 | 2/2012 | Culbert et al. |
| 8,295,629 | B2 | 10/2012 | Wey et al. |
| 8,497,897 | B2 | 7/2013 | Gere |
| 8,681,250 | B2 | 3/2014 | Culbert et al. |
| 9,001,227 | B2 * | 4/2015 | Aleksic ................ H04N 5/2258 348/218.1 |

(Continued)

FOREIGN PATENT DOCUMENTS

| | | |
|---|---|---|
| JP | 4676385 | 2/2011 |
| KR | 20150007114 | 1/2015 |

(Continued)

*Primary Examiner* — Lin Ye
*Assistant Examiner* — John H Morehead, III
(74) *Attorney, Agent, or Firm* — Volentine, Whitt & Francos, PLLC

(57) ABSTRACT

A method of enhancing a low-light image includes receiving a first image from an RWB image sensor, receiving a second image from an RGB image sensor, receiving an illumination value from an illumination sensor, and selecting at least one of the first and second images and generating a third image using the at least one selected image.

20 Claims, 12 Drawing Sheets

(56) References Cited

U.S. PATENT DOCUMENTS

| | | | | |
|---|---|---|---|---|
| 2005/0128509 A1* | 6/2005 | Tokkonen | ............... | H04N 9/045 358/1.15 |
| 2008/0030611 A1* | 2/2008 | Jenkins | ................. | H04N 9/045 348/336 |
| 2010/0238327 A1* | 9/2010 | Griffith | ................ | H04N 5/2251 348/240.99 |
| 2010/0277619 A1* | 11/2010 | Scarff | ................. | H04N 5/2258 348/240.1 |
| 2012/0200734 A1* | 8/2012 | Tang | ................. | H04N 5/23245 348/223.1 |
| 2012/0242867 A1* | 9/2012 | Shuster | ................. | G01B 11/22 348/240.2 |
| 2013/0278729 A1* | 10/2013 | Choi | ........................ | H04N 7/14 348/47 |
| 2014/0171124 A1* | 6/2014 | Goglin | .................... | G06F 1/325 455/456.4 |
| 2014/0232900 A1* | 8/2014 | Wernersson | ......... | H04N 5/2251 348/223.1 |
| 2015/0015740 A1 | 1/2015 | Cho et al. | | |
| 2015/0085174 A1* | 3/2015 | Shabtay | .............. | H04N 5/23296 348/336 |
| 2015/0103212 A1* | 4/2015 | Saito | ....................... | H04N 9/045 348/242 |
| 2015/0172608 A1* | 6/2015 | Routhier | .............. | H04N 5/2258 348/265 |
| 2015/0227025 A1* | 8/2015 | Park | ....................... | G03B 15/05 348/224.1 |
| 2015/0241713 A1* | 8/2015 | Laroia | ................. | G02B 27/648 348/208.2 |

FOREIGN PATENT DOCUMENTS

| | | |
|---|---|---|
| KR | 20150029897 A | 3/2015 |
| KR | 1515404 | 4/2015 |
| WO | WO2015015383 A2 | 2/2015 |

\* cited by examiner

LOW-LIGHT IMAGE QUALITY ENHANCEMENT METHOD FOR IMAGE PROCESSING DEVICE AND METHOD OF OPERATING IMAGE PROCESSING SYSTEM PERFORMING THE METHOD

PRIORITY STATEMENT

This application claims priority under 35 U.S.C. § 119(a) from Korean Patent Application No. 10-2015-0146914 filed on Oct. 21, 2015, the disclosure of which is hereby incorporated by reference in its entirety.

BACKGROUND

The inventive concept relates to the field of imaging and image processing. More particularly, the inventive concept relates to a device having a dual camera feature and to a method of producing images using a dual camera.

Recent multimedia devices include a camera module and implement diverse functions in combination with application programs. For instance, multimedia devices generate high-dynamic range images and stereo images or detect or recognize a particular object, using converted images which have been taken by a camera module.

However, such functions may be influenced by conditions in which multimedia devices having a camera module operate. In particular, when the amount of light incident on a camera module is not sufficient, i.e., in low-light conditions, most pixels are dark, which results in a low-quality image in which an object is unidentifiable and color information is greatly distorted. Therefore, an approach to enhancing the quality of an image generated by a camera module in real time is desired.

SUMMARY

According to some examples of the inventive concept, there is provided a method of operation of a dual camera by which low-light image quality may be enhanced, and which camera includes an RWB image sensor and an RGB image, the method including producing first image information using the RWB image sensor, producing second image information using the RGB image sensor, and selecting at least one of the first and second image information and producing third image information using the at least one selected image information.

According to other examples of the inventive concept, there is provided a method of operation of a dual camera by which low-light image quality may be enhanced and which camera includes an RWB image sensor and an RGB image sensor, the method including producing first image information and second image information respectively using the RWB image sensor and the RGB image sensor, and selecting at least one of the first image information and the second image information and producing third image information using the at least one selected image information, in dependence on an operation mode of the dual camera and based at least in part on an illumination value of luminance in an environment of the dual camera.

According to other examples of the inventive concept, there is provided a method by which low-light image quality of an image processing device may be enhanced, and which method includes receiving a first image from an RWB image sensor, receiving a second image from an RGB image sensor, and selecting one of the first image and the second image and outputting the selected image as a final image.

According to other examples of the inventive concept, there is provided an imaging method of a camera system, the method comprising producing first image information of red, white and blue light in a field of view of the camera system, producing second image information, discrete from the first information, of red, green and blue light in a field of view of the camera system, obtaining a measure of luminance in an environment in which the camera system is located, selectively processing the first and second image information in a manner based, at least in part, on said measure of the luminance, and storing final image information in a memory and/or displaying the final image information on a display, as a result of the selective processing of the image information.

BRIEF DESCRIPTION OF THE DRAWINGS

The above and other features and advantages of the inventive concept will become more apparent from the detailed description of examples thereof that follows as made with reference to the attached drawings in which.

DETAILED DESCRIPTION

Figure 1:
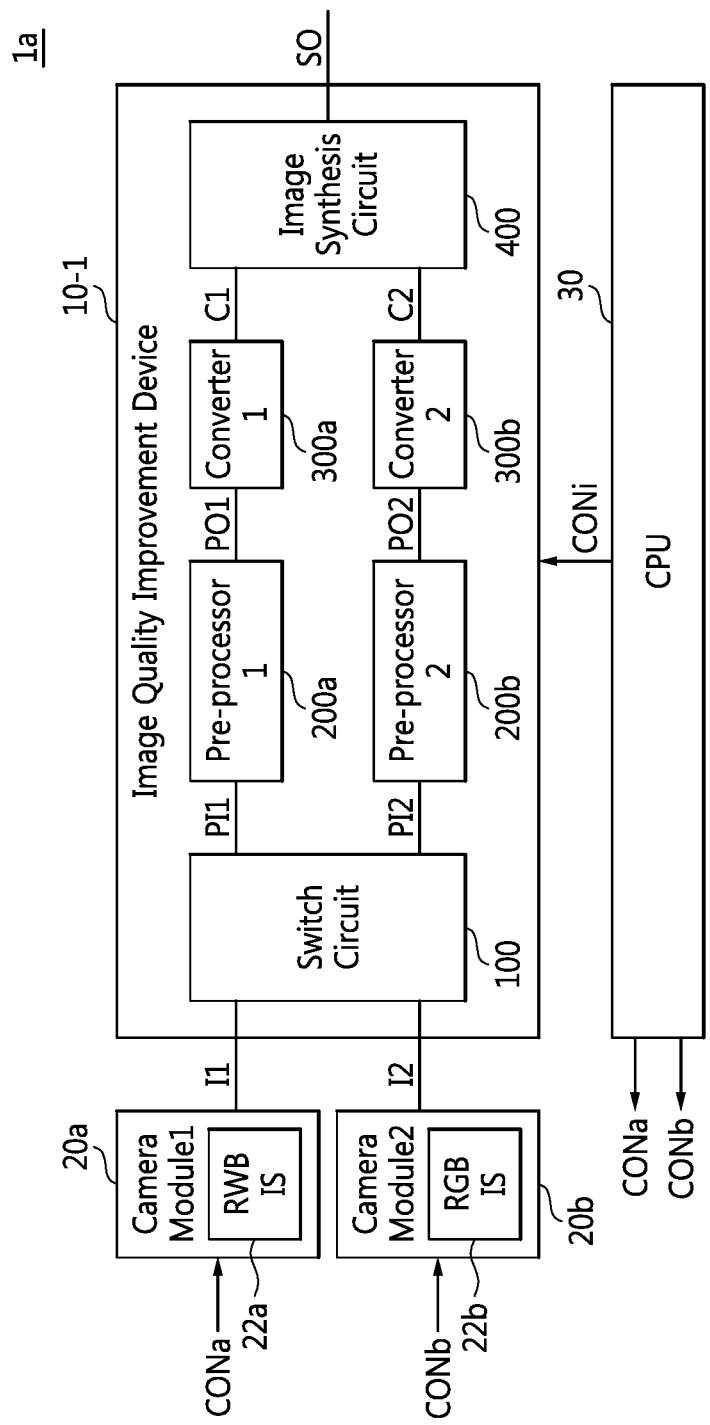
FIG. 1 is a block diagram of an imaging system according to some examples of the inventive concept.

The inventive concept now will be described more fully hereinafter with reference to the accompanying drawings, in which examples of the invention are shown. This invention may, however, be realized in many different forms and should not be construed as limited to the examples set forth herein. Rather, these examples are provided so that this disclosure will be thorough and complete, and will fully convey the scope of the inventive concept to those skilled in the art. In the drawings, the size and relative sizes of layers and regions may be exaggerated for clarity. Like numbers designate like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein. For example, the term "image" may not refer to an optical image but in context may alternatively refer to an electronic image. Thus, the term "image information" or "information" of a particular image may refer to electronic information such as individual data or a data stream that is representative of, i.e., defines or is in the format of, a still image or video. Also, it will be readily understood that the term "camera" is not limited to a stand alone camera but may refer to a component that serves as a camera in any electronic product.

As is traditional in the field of the inventive concepts, examples may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the examples may be physically separated into two or more interacting and discrete blocks without departing from the scope of the inventive concepts. Likewise, the blocks of the examples may be physically combined into more complex blocks without departing from the scope of the inventive concepts.

FIG. 1 is a block diagram of an imaging system 1a according to some examples of the inventive concept. The imaging system 1a may include an image quality improvement device 10-1, a first camera module 20a, a second camera module 20b, and a central processing unit (CPU) 30.

The first camera module 20a may include an RWB image sensor 22a. The second camera module 20b may include an RGB image sensor 22b. In these examples, the RWB image sensor 22a includes RWB color pixels which generate red, white and blue color information and the RGB image sensor 22b includes RGB color pixels which generate red, green and blue color information.

Each of the RWB image sensor 22a and the RGB image sensor 22b may convert the intensity of incident light, which is reflected from an object and comes through lenses of the first camera module 20a or the second camera module 20b, into an electrical signal using a photoelectric element and may convert the electrical signal into a digital signal. The digital signal may be a stream of sequential digital values corresponding to pixels in a pixel array of each of the RWB image sensor 22a and the RGB image sensor 22b.

The digital signals (or more broadly "image information") respectively output from the RWB image sensor 22a and the RGB image sensor 22b may represent or "form" a first image I1 and a second image I2, respectively. The image information of the first image I1 and the image information of the second image I2 (referred to hereinafter simply as the first image I1 and the second image I2) may be input to a switch circuit of the image quality improvement device 10-1.

The RWB image sensor 22a has better sensitivity in low-light conditions than the RGB image sensor 22b. However, the RWB image sensor 22a is disadvantageous in that the output of each pixel may be saturated in high-light conditions. In other words, the RWB image sensor 22a is more suitable for use in low-light conditions and the RGB image sensor 22b is more suitable for use in high-light conditions. Here, the term "suitable" means that the image sensor can produce an image of an object that is closer to an image of the same object as perceived by the human eye. The imaging system 1a uses both the RGB image sensor 22b and the RWB image sensor 22a to minimize the distortion of color information and produce enhanced images in low-light conditions as well as in high-light conditions.

The first camera module 20a and the second camera module 20b may be integrated into a single multimedia device, thereby forming a dual camera system. The first image I1 generated from the first camera module 20a and the second image I2 generated from the second camera module 20b may include information about a scene viewed from the same position. However, the information of the first image I1 and the second image I2 is not restricted to this example. In other examples, the first image I1 and the second image I2 may include information about a scene viewed from different positions in a three-dimensional (3D) reference system.

The first camera module 20a and the second camera module 20b may be operated in at least one of various modes. The operation modes may include a still mode and a video mode. When the first and second camera modules 20a and 20b operate in the still mode, the first image I1 and the second image I2 each may be a single image. When the first and second camera modules 20a and 20b operate in the video mode, each of the first and second images I1 and I2 may be a group of a plurality of images I1-1 through I1-$m$ or I2-1 through I2-$m$, where "m" is an integer of at least 2.

The first and second camera modules 20a and 20b may be each selectively turned on and off under the control of the CPU 30. That is, power may be supplied to or cut off from first and second camera modules 20a and 20b. For instance, the first and second camera modules 20a and 20b may be turned on or off depending on the operation mode.

More specifically, the CPU 30 may send a control signal CONa for turning on or off the power to the first camera module 20a or send a control signal CONb for turning on or off the power to the second camera module 20b. The CPU 30 may provide a control signal CONi for controlling the image quality improvement device 10-1 based on the operation mode of the first and second camera modules 20a and 20b and an illumination value, where "i" is an integer of at least 1 and at most "n". Here, the illumination value may be received from an illumination (or light) sensor and thus be a value of the luminance in the field of view of the sensor. However, the inventive concept is not limited to the current examples. The illumination value may be a value based on the brightness of each of the first and second images I1 and I2 in other examples. In any case, and generally speaking, the illumination value is a measure of luminance in an environment in which the dual camera is disposed and operating.

The CPU 30 may determine whether the first and second camera modules 20a and 20b are in the still mode. When it is determined that the first and second camera modules 20a and 20b are operating in the still mode, the CPU 30 may determine whether the illumination value is less than a first threshold. When it is determined that the illumination value is less than the first threshold, the CPU 30 may send a control signal CON1 for connecting the first camera module 20a to a first pre-processor 200a via a switch circuit 100. When it is determined that the illumination value is equal to or greater than the first threshold, the CPU 30 may send the control signal CON1 for connecting the second camera module 20b to a second pre-processor 200b via the switch circuit 100.

When it is determined that the first and second camera modules 20a and 20b are in the video mode, the CPU 30 may send the control signal CON1 for connecting the first and second camera modules 20a and 20b to the first and second pre-processors 200a and 200b, respectively, via the switch circuit 100.

Alternatively, when it is determined that the first and second camera modules 20a and 20b are in the video mode, the CPU 30 may determine whether the illumination value is less than a second threshold. When it is determined that the illumination value is equal to or greater than the second threshold, the CPU 30 may determine whether the illumination value is less than a third threshold.

When the illumination value is less than the second threshold, the CPU 30 may send the switch circuit 100 the control signal CON1 for connecting the first camera module 20a to the first pre-processor 200a and disconnecting the second camera module 20b from the second pre-processor 200b. When the illumination value is equal to or greater than the second threshold and less than the third threshold, the CPU 30 may send the switch circuit 100 the control signal CON1 for connecting the first and second camera modules 20a and 20b to the first and second pre-processors 200a and 200b, respectively. When the illumination value is equal to or greater than the third threshold, the CPU 30 may send the switch circuit 100 the control signal CON1 for disconnecting the first camera module 20a from the first pre-processor 200a and connecting the second camera module 20b to the second pre-processor 200b.

The CPU 30 may store information MD_IF about the operation mode of the first and second camera modules 20a and 20b in a register of the image quality improvement device 10-1. The CPU 30 may send the first and second pre-processors 200a and 200b of the image quality improvement device 10-1 a control signal CON2 for controlling the first and second pre-processors 200a and 200b. The control signal CON2 may be based on sensor characteristic information regarding the RWB image sensor 22a and the RGB image sensor 22b of the first camera module 20a and the second camera module 20b, respectively.

The sensor characteristic information may include at least one among lens shading information, bad pixel information, chromatic aberration information, and rectification information. The sensor characteristic information may be set and stored in an external memory in advance of the operation of the imaging system 1a.

The CPU 30 may send a first converter 300a and a second converter 300b of the image quality improvement device 10-1 a control signal CON3 for controlling the first and second converters 300a and 300b, respectively. The control signal CON3 may be information about the size or format of the first and second images I1 and I2. The information about the size or format may be set and stored in an external memory in advance of the operation of the imaging system 1a.

The CPU 30 may send an image synthesis circuit 400 of the image quality improvement device 10-1 a control signal CON4 for controlling the image synthesis circuit 400. The control signal CON4 may include information about the operation mode of the first and second camera modules 20a and 20b and the illumination value.

The image quality improvement device 10-1 may receive the first image I1 and the second image I2 from the first camera module 20a and the second camera module 20b, respectively, and may output image information representing an image SO (referred to hereinafter simply as "image SO") with improved low-light image quality. The image quality improvement device 10-1 may include the switch circuit 100, the first pre-processor 200a, the second pre-processor 200b, the first converter 300a, the second converter 300b, and the image synthesis circuit 400. However, at least one of the elements, e.g., the first and second pre-processors 200a and 200b and the first and second converters 300a and 300b, of the image quality improvement device 10-1 may be omitted in other examples.

The switch circuit 100 may selectively transmit at least one of the first and second images I1 and I2 respectively output from the first and second camera modules 20a and 20b to the first and second pre-processors 200a and 200b. For instance, the switch circuit 100 may connect the first camera module 20a to the first pre-processor 200a under the control of the CPU 30, in which case the first image I1 output from the first camera module 20a is input to the first pre-processor 200a. The switch circuit 100 may connect the second camera module 20b to the second pre-processor 200b under the control of the CPU 30, in which case the second image I2 output from the second camera module 20b is input to the second pre-processor 200b.

The switch circuit 100 may selectively connect the first and second camera modules 20a and 20b to the first and second pre-processors 200a and 200b, respectively, according to the operation mode of each of the first and second camera modules 20a and 20b under the control of the CPU 30. The switch circuit 100 may selectively connect the first and second camera modules 20a and 20b to the first and second pre-processors 200a and 200b, respectively, based on the illumination value received from the illumination sensor, under the control of the CPU 30.

For instance, when the first and second camera modules 20a and 20b operate in the still mode and the illumination value is less than the first threshold, the switch circuit 100 may connect the first camera module 20a to the first pre-processor 200a under the control of the CPU 30. However, when the illumination value is equal to or greater than the first threshold, the switch circuit 100 may connect the second camera module 20b to the second pre-processor 200b under the control of the CPU 30.

When the first and second camera modules 20a and 20b operate in the video mode, the switch circuit 100 may connect the first and second camera modules 20a and 20b to the first and second pre-processors 200a and 200b, respectively, under the control of the CPU 30.

Alternatively, when the first and second camera modules 20a and 20b operate in the video mode and the illumination value is less than the second threshold, the switch circuit 100 may connect the first camera module 20a to the first pre-processor 200a and disconnect the second camera module 20b from the second pre-processor 200b under the control of the CPU 30. When the illumination value is equal to or greater than the second threshold and less than the third threshold, the switch circuit 100 may connect the first and second camera modules 20a and 20b to the first and second pre-processors 200a and 200b, respectively. When the illumination value is equal to or greater than the third threshold, the switch circuit 100 may disconnect the first camera module 20a from the first pre-processor 200a and connect the second camera module 20b to the second pre-processor 200b.

Consequently, the switch circuit 100 of the image quality improvement device 10-1 may selectively connect the first and second camera modules 20a and 20b to the first and second pre-processors 200a and 200b according to the operation mode of the first and second camera modules 20a and 20b and the illumination value.

When one of the first and second camera modules 20a and 20b is not connected to one of the first and second pre-processors 200a and 200b under conditions as described above, the image I1 or I2 generated from the one of the first and second camera modules 20a and 20b is not processed. Accordingly, i.e., by avoiding the processing of images from one of the first and second camera modules 20a and 20b, problems associated with computational complexity may be obviated.

The first and second pre-processors 200a and 200b will be described in detail with reference to FIGS. 2 and 3. The first and second pre-processors 200a and 200b may have the same structure and functions as each other, and therefore, redundant description of the structure and functions will be omitted. The structure and function of the first pre-processor 200a will be mainly described.

Figure 2:
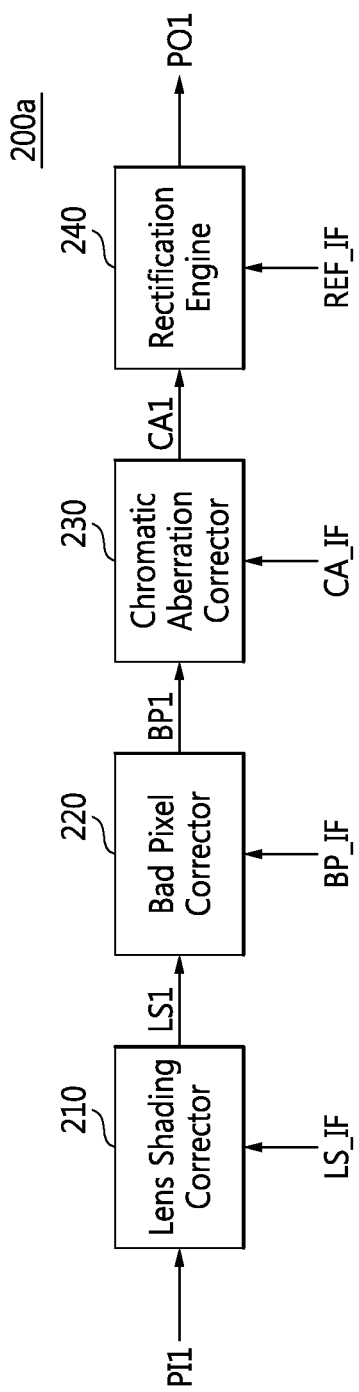
FIG. 2 is a block diagram of a first pre-processor illustrated in FIG. 1 according to some examples of the inventive concept.
Figure 3:
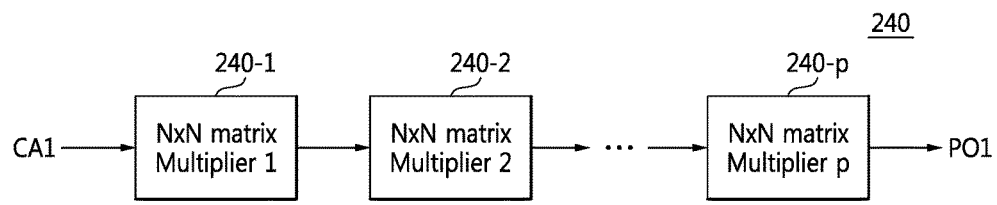
FIG. 3 is a block diagram of a rectification engine illustrated in FIG. 2 according to some examples of the inventive concept.

FIG. 2 is a block diagram of the first pre-processor 200a illustrated in FIG. 1 according to some examples of the inventive concept. FIG. 3 is a block diagram of a rectification engine 240 illustrated in FIG. 2 according to some examples of the inventive concept. Referring to FIGS. 1 and 2, the first pre-processor 200a may include a lens shading corrector 210, a bad pixel corrector 220, a chromatic aberration corrector 230, and the rectification engine 240.

Under the control of the CPU 30, the lens shading corrector 210 may correct a difference in shade across the field of view, e.g., correct for a case in which an image becomes darker from the center of each of the RWB image sensor 22a and the RGB image sensor 22b toward the periphery thereof due to some undesired shading effect, based on shading information LS_IF received. The difference in shade, i.e., the undesired shading effect, may be a lens shading effect caused by the curved surface of a lens of each of the first and second camera modules 20a and 20b.

Under the control of the CPU 30, the bad pixel corrector 220 may correct for the outputs of a static bad pixel produced during sensor manufacturing and a dynamic bad pixel produced due to heat generation, based on bad pixel information BP_IF received. The bad pixel corrector 220 may detect a bad pixel, correct a pixel value of the bad pixel, and generate a corrected pixel value.

Under the control of the CPU 30, the chromatic aberration corrector 230 may correct a chromatic aberration of each of the first and second camera modules 20a and 20b, based on chromatic aberration information CA_IF received. Chromatic aberration may occur because the refractive index a lens of each of the first and second camera modules 20a and 20b varies with the wavelength of light incident on the lens, and light with longer wavelengths is focused at positions farther from the lens.

Under the control of the CPU 30, the rectification engine 240 may perform a correction to make the first and second images I1 and I2 have the same geometric shape and size, based on rectification information REF_IF received. Referring to FIGS. 1 and 3, the rectification engine 240 may include one or more N×N matrix multipliers 240-1 through 240-p, where "p" is an integer of at least 1.

The rectification engine 240 may perform geometric transformation on at least one of the first and second images I1 and I2 based on the rectification information REF_IF. The geometric transformation may include geometric linear transformation such as rotation transformation, scaling transformation, or affine transformation.

The first converter 300a may convert the size or format of an image PO1 received from the first pre-processor 200a and may output image information of a converted image C1 (referred to simply as the "converted image C1" hereinafter) to the image synthesis circuit 400. The second converter 300b may convert the size or format of an image represented by image information PO2 received from the second pre-processor 200b and may output image information of a converted image C2 (referred to simply as the "converted image C2" hereinafter) to the image synthesis circuit 400. The first and second converters 300a and 300b will be described in detail with reference to FIG. 4.

The first and second converters 300a and 300b may have the same structure and functions as each other, and therefore, redundant description of the structure and functions will be omitted. The structure and function of the first converter 300a will be mainly described.

Figure 4:
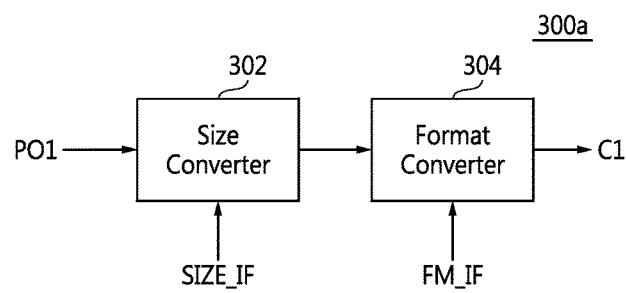
FIG. 4 is a block diagram of a first converter illustrated in FIG. 1 according to some examples of the inventive concept.

FIG. 4 is a block diagram of the first converter 300a illustrated in FIG. 1 according to some examples of the inventive concept. Referring to FIGS. 1 and 4, the first converter 300a may include a size converter 302 and a format converter 304.

The size converter 302 may convert the spatial resolution of the input image PO1 based on size information SIZE_IF. The format converter 304 may convert the format of an output image of the size converter 302 based on format information FM_IF to output the converted image C1.

Under the control of the CPU 30, the image synthesis circuit 400 may output either the output image C1 of the first converter 300a or the output image C2 of the second converter 300b as the output image SO or may mix the output image C1 of the first converter 300a and the output image C2 of the second converter 300b and output (image information of) the synthesized image SO according to the operation mode of the first and second camera modules 20a and 20b. The image synthesis circuit 400 will be described in detail with reference to FIGS. 5 through 6C.

Figure 5:
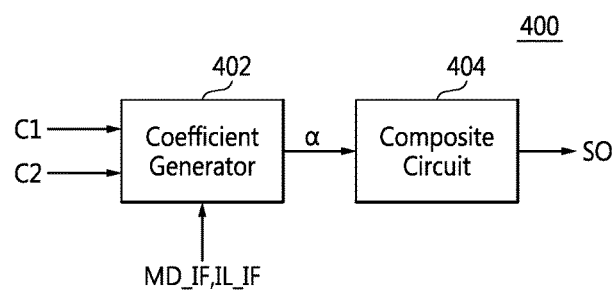
FIG. 5 is a block diagram of an image synthesis circuit illustrated in FIG. 1 according to some examples of the inventive concept.
Figure 6A:
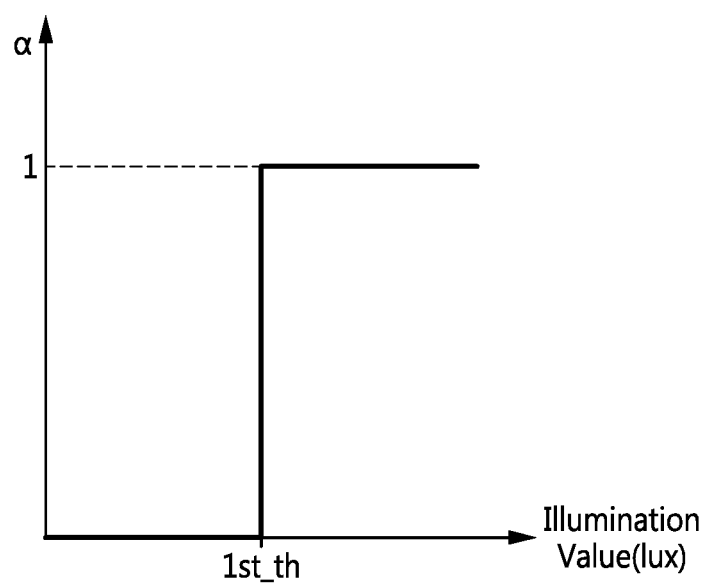
FIG. 6A is a graph for explaining an output image of an image quality improvement device when the operation mode of image sensors is still mode, according to some examples of the inventive concept.
Figure 6B:
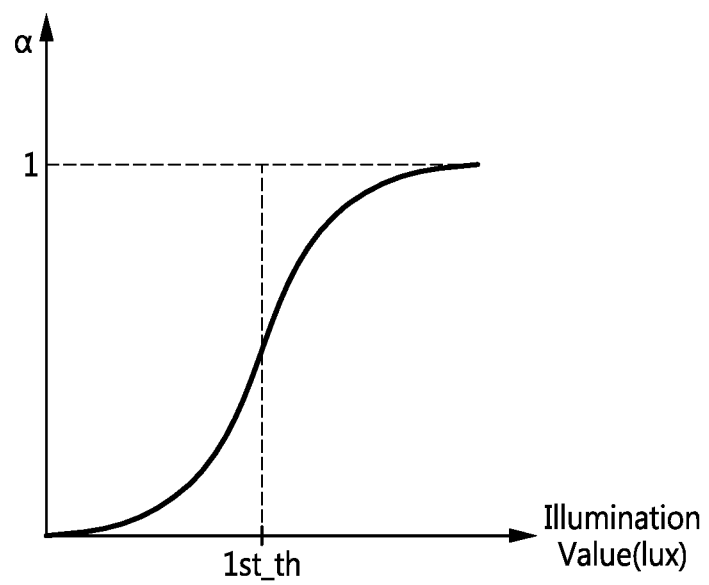
FIG. 6B is a graph, corresponding to a look up table, for explaining an output image of an image quality improvement device when the operation mode of image sensors is video mode, according to some examples of the inventive concept.
Figure 6C:
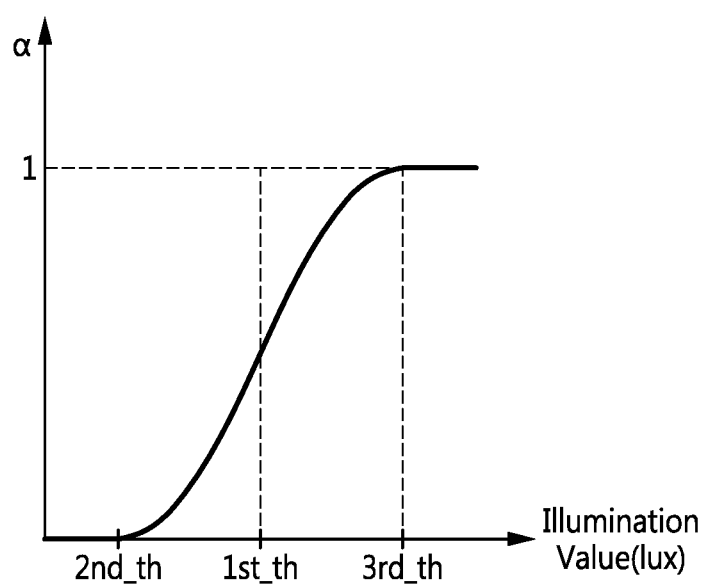
FIG. 6C is a graph, corresponding to a look up table, for explaining an output image of an image quality improvement device when the operation mode of image sensors is video mode, according to other examples of the inventive concept.

FIG. 5 is a block diagram of the image synthesis circuit 400 illustrated in FIG. 1 according to some examples of the inventive concept. FIG. 6A is a diagram for explaining an output image of an image quality improvement device when the operation mode of image sensors is still mode, according to some examples of the inventive concept. FIG. 6B is a diagram for explaining an output image of an image quality improvement device when the operation mode of image sensors is video mode, according to some examples of the inventive concept. FIG. 6C is a diagram for explaining an output image of an image quality improvement device when the operation mode of image sensors is video mode, according to other examples of the inventive concept.

Referring to FIGS. 1 and 5, the image synthesis circuit 400 may include a coefficient generator 402 and a composite circuit 404. The coefficient generator 402 may receive information MD_IF about the operation mode of the first and second camera modules 20a and 20b and an illumination value IL_IF from the CPU 30.

Referring to FIGS. 1, 5, and 6A, the image synthesis circuit 400 may output the output image C1 of the first converter 300a under the control of the CPU 30 when the first and second camera modules 20a and 20b operate in the still mode and the illumination value IL_IF is less than the first threshold. When the illumination value IL_IF is equal to or greater than the first threshold, the image synthesis circuit 400 may output the output image C2 of the second converter 300b. The output image C1 of the first converter 300a or the output image C2 of the second converter 300b may be a final image. Meanwhile, the output images C1 and C2 of the first and second converters 300a and 300b may bypass the coefficient generator 402 and the composite circuit 404 of the image synthesis circuit 400.

Referring to FIGS. 1, 5, and 6B, the image synthesis circuit 400 may output the synthesized image SO based on the output image C1 of the first converter 300a and the output image C2 of the second converter 300b under the control of the CPU 30 when the first and second camera modules 20a and 20b operate in the video mode. At this time, the coefficient generator 402 may access a lookup table of interpolation coefficients correlated with illumination values from an external memory under the control of the CPU 30 and select the coefficient correlated with the current illumination value. The lookup table may be set and stored in the external memory in advance of the operation of the imaging system 1a. The synthesized image SO may be represented by Equation 1:

$$SO = (1-\alpha) \times C1 + \alpha \times C2, \quad (1)$$

where α is the interpolation coefficient, C1 is the output image of the first converter 300a, and the C2 is the output image of the second converter 300b.

Referring to FIGS. 1, 5, and 6C, the image synthesis circuit 400 may output the synthesized image SO based on the output image C1 of the first converter 300a and the output image C2 of the second converter 300b under the control of the CPU 30 when the first and second camera modules 20a and 20b operate in the video mode. At this time, the coefficient generator 402 may access a lookup table of interpolation coefficients correlated with illumination value from an external memory under the control of the CPU 30 and select the coefficient correlated with the current illumination value. The synthesized image SO may be determined by Equation 2:

$$SO = \begin{cases} C1, & \text{if } IL\_IF < 2nd\_th \\ a \times C1 + (1-\alpha) \times C2, & \text{if } 2nd\_th \le IL\_IF < 3rd\_th, \\ C2, & \text{if } 3rd\_th \le IL\_IF \end{cases} \quad (2)$$

where α is the interpolation coefficient, C1 is the output image of the first converter 300a, the C2 is the output image of the second converter 300b, 2nd_th is the second threshold, and 3rd_th is the third threshold.

Figure 7:
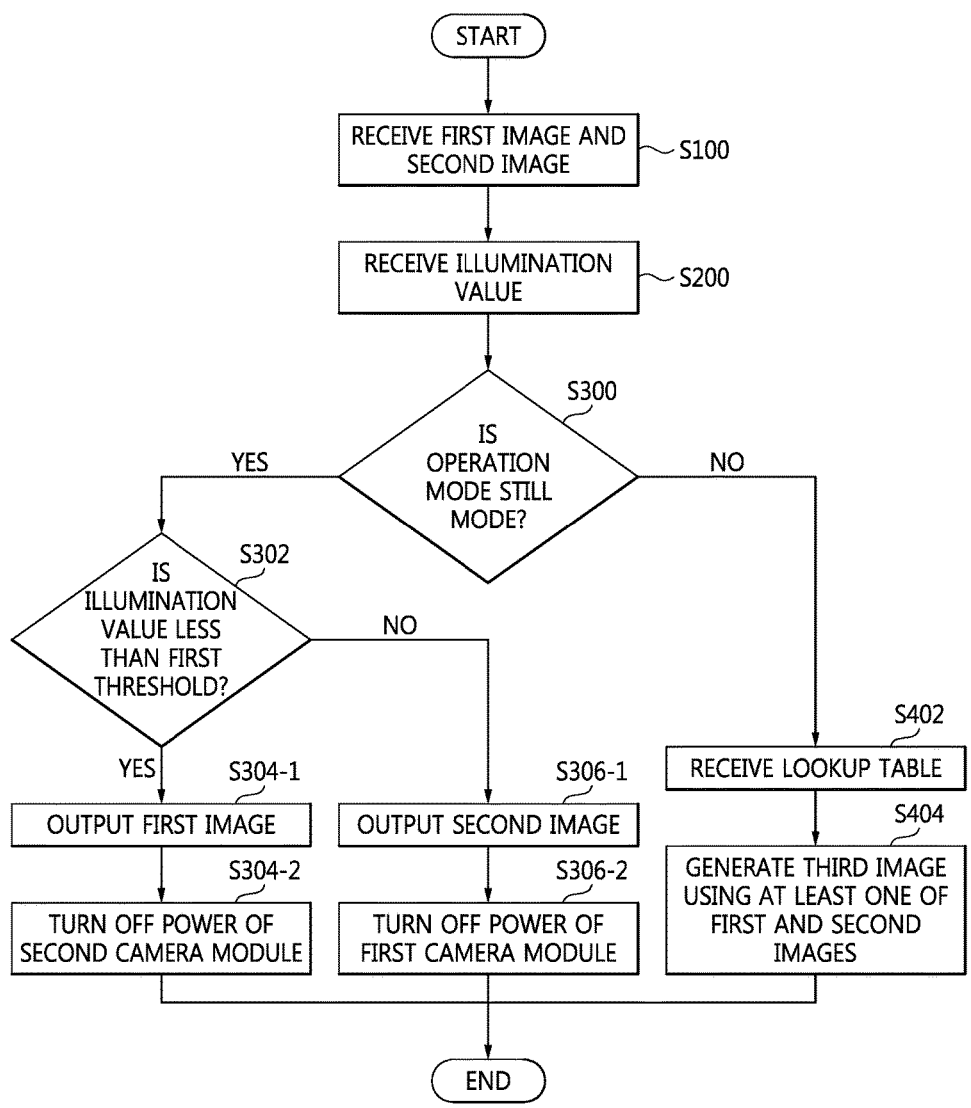
FIG. 7 is a flowchart of a method of improving a low-light image quality of an image in an image processing device, according to some examples of the inventive concept.

FIG. 7 is a flowchart of a method of improving a low-light image quality of an image according to some examples of the inventive concept. Referring to FIGS. 1 through 7, the image quality improvement device 10-1 may receive the first and second images I1 and I2 respectively from the first and second camera modules 20a and 20b (operation S100) and may receive an illumination value from an illumination sensor (operation S200).

The image quality improvement device 10-1 may determine whether the first and second camera modules 20a and 20b are operating in the still mode (operation S300). When the first and second camera modules 20a and 20b are operating in the still mode (i.e., in case of YES in operation S300), the image quality improvement device 10-1 may determine whether the illumination value is less than the first threshold (operation S302).

When the illumination value is less than the first threshold (i.e., in case of YES in operation S302), the image quality improvement device 10-1 may output the first image I1 in operation S304-1 and turn off the second camera module 20b (S304-2). When the illumination value is equal to or greater than the first threshold (i.e., in case of NO in operation S302), the image quality improvement device 10-1 may output the second image I2 (operation S306-1) and turn off the first camera module 20a (operation S306-2).

When the first and second camera modules 20a and 20b are operating in the video mode (i.e., in case of NO in operation S300), the image quality improvement device 10-1 may receive a lookup table in operation S402 and may generate a third image using at least one of the first and second images I1 and I2 (operation S404). The lookup table may include an interpolation coefficient corresponding to a change in the illumination value. The lookup table may be set and stored in an external memory in advance of the operation of the imaging system 1a. The detailed description of operations S402 and S404 has been made with reference to FIGS. 1, 5, and 6B above and is thus omitted here.

Figure 8:
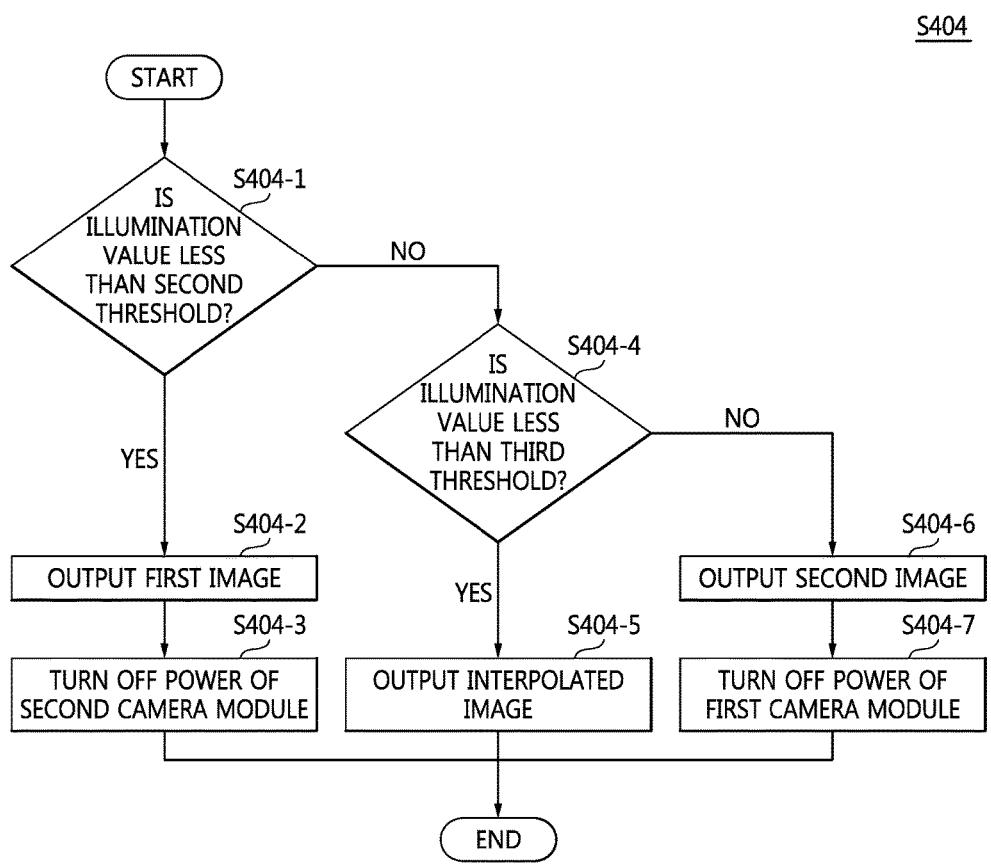
FIG. 8 is a detailed flowchart of the operation of generating a third image in the method illustrated in FIG. 7.

FIG. 8 is a detailed flowchart of operation S404 in the method illustrated in FIG. 7. Referring to FIGS. 1 through 8, when the first and second camera modules 20a and 20b operate in the video mode (i.e., in case of NO in operation S300), the image quality improvement device 10-1 may receive the lookup table in operation S402 and may generate the third image using at least one of the first and second images I1 and I2 (operations S404-1 through S404-7). The detailed description of operations S404-1 through S404-7 has been made with reference to FIGS. 1, 5, and 6C and is thus omitted here.

Figure 9:
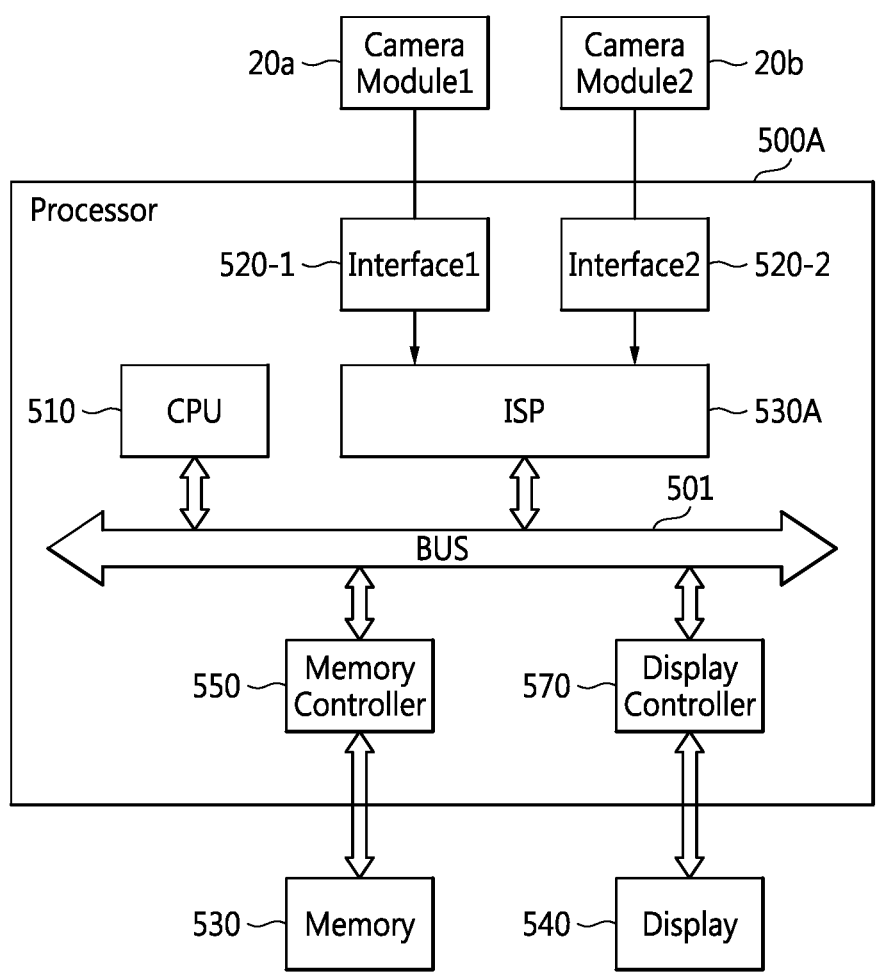
FIG. 9 is a block diagram of an imaging system according to other examples of the inventive concept.

FIG. 9 is a block diagram of an imaging system 1b according to other examples of the inventive concept. Referring to FIG. 9, the imaging system 1b may include a processor 500A, the first camera module 20a, the second camera module 20b, an external memory 530, and a display 540. The imaging system 1b may be implemented as a personal computer (PC) or a mobile device. The mobile device may be a laptop computer, a cellular phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, or an e-book.

The processor 500A may be implemented as an integrated circuit (IC), a motherboard, a system on chip (SoC), an application processor (AP), or a mobile AP, but the inventive concept is not restricted to these examples. The processor 500A may include bus architecture (or a bus) 501, a CPU 510, a first interface 520-1, a second interface 520-2, an image signal processor (ISP) 530A, a memory controller 550, and a display controller 570.

The CPU 510, the ISP 530A, the memory controller 550, and the display controller 570 may communicate with one another (transmit a command and/or data from one to the other) through the bus architecture 501. The bus architecture 501 may be implemented as a bus using an advanced microcontroller bus architecture (AMBA) protocol, a bus using an advanced high-performance bus (AHB) protocol, a bus using an advanced peripheral bus (APB) protocol, a bus using an advanced extensible interface (AXI) protocol, or a combination thereof, but the inventive concept is not restricted to these examples.

The CPU 510 may correspond to the CPU 30 illustrated in FIG. 1. The CPU 510 may control the overall operation of the processor 500A. For example, the CPU 510 may control the first interface 520-1, the second interface 520-2, the ISP 530A, the memory controller 550, and the display controller 570. The CPU 510 may include one core or more.

The first interface 520-1 may receive image information ("a first image" hereinafter) and first control signals from the first camera module 20a and transmit the first image and the first control signals to the ISP 530A. The second interface 520-2 may receive image information ("a second image" hereinafter) and second control signals from the second camera module 20b and transmit the second image and the second control signals to the ISP 530A. The first image may be a first picture (optical image), first image data, a first data stream, or first frame data. The second image may be a second picture (optical image), second image data, a second data stream, or second frame data.

The first camera module 20a may comprise a complementary metal-oxide semiconductor (CMOS) image sensor chip. The first camera module 20a may transmit the first image and the first control signals to the first interface 520-1 using mobile industry processor interface (MIPI)® camera serial interface (CSI). The second camera module 20b may comprise a CMOS image sensor chip. The second camera module 20b may transmit the second image and the second control signals to the second interface 520-2 using MIPI® CSI. The resolution of the first image may be different from that of the second image.

The ISP 530A may perform functions of the image quality improvement device 10-1 of the imaging system 1a illustrated in FIG. 1. In this case, the image quality improvement device 10-1 may constitute the ISP 530A.

The ISP 530A may perform time-division multiplexing (TDM) on the first image and/or the second image in units of line data instead of frame data without using the external memory 530. The ISP 530A may include a plurality of ISP cores in order to process images output from the first and second camera modules 20a and 20b in units of line data simultaneously, in parallel, or on the fly in TDM mode. Each of the ISP cores may perform at least one of auto dark level compensation, bad pixel replacement, noise reduction, lens shading compensation, color correction, RGB gamma correction, edge enhancement, hue control, and color suppression. The memory controller 550 may store line data that has been processed by the ISP 530A in the TDM mode in the external memory 530 under the control of the CPU 510.

The display controller 570 may transmit data (e.g., frame data) output from the external memory 530 to the display 540 under the control of the CPU 510. The display controller 570 may transmit the data (e.g., frame data) output from the external memory 530 to the display 540 using MIPI® display serial interface (DSI) or embedded DisplayPort (eDP).

Figure 10:
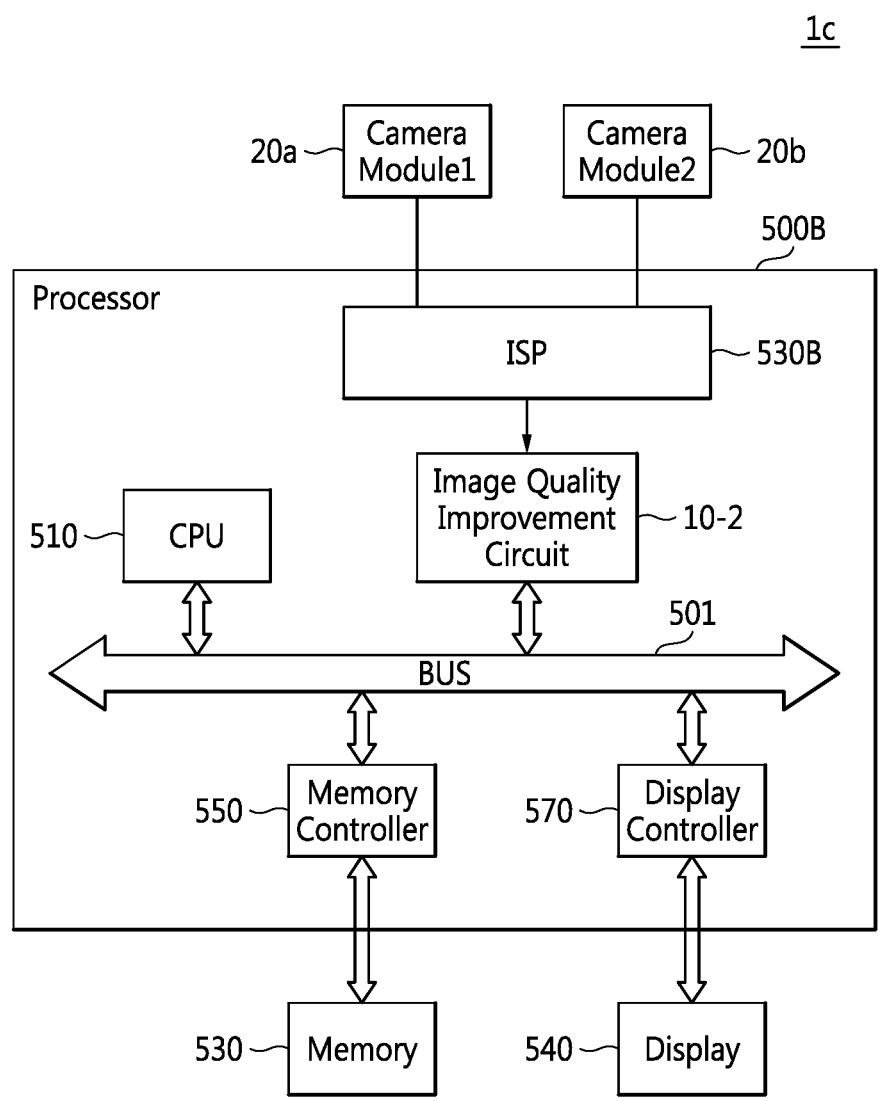
FIG. 10 is a block diagram of an imaging system according to still other examples of the inventive concept.

FIG. 10 is a block diagram of an imaging system 1c according to still other examples of the inventive concept. Referring to FIGS. 9 and 10, unlike the imaging system 1b, the imaging system 1c has an image quality improvement device 10-2 provided outside an ISP 530B. In other words, the image quality improvement device 10-2 is implemented as an independent intellectual property (IP) or semiconductor chip.

The ISP 530B may convert raw image data in a first format into input image data INPUT in a second format. The first format may be a Bayer pattern but is not restricted thereto. The second format may be YUV, Y'UV, YCbCr, YPbPr, or RGB but is not restricted thereto.

Figure 11:
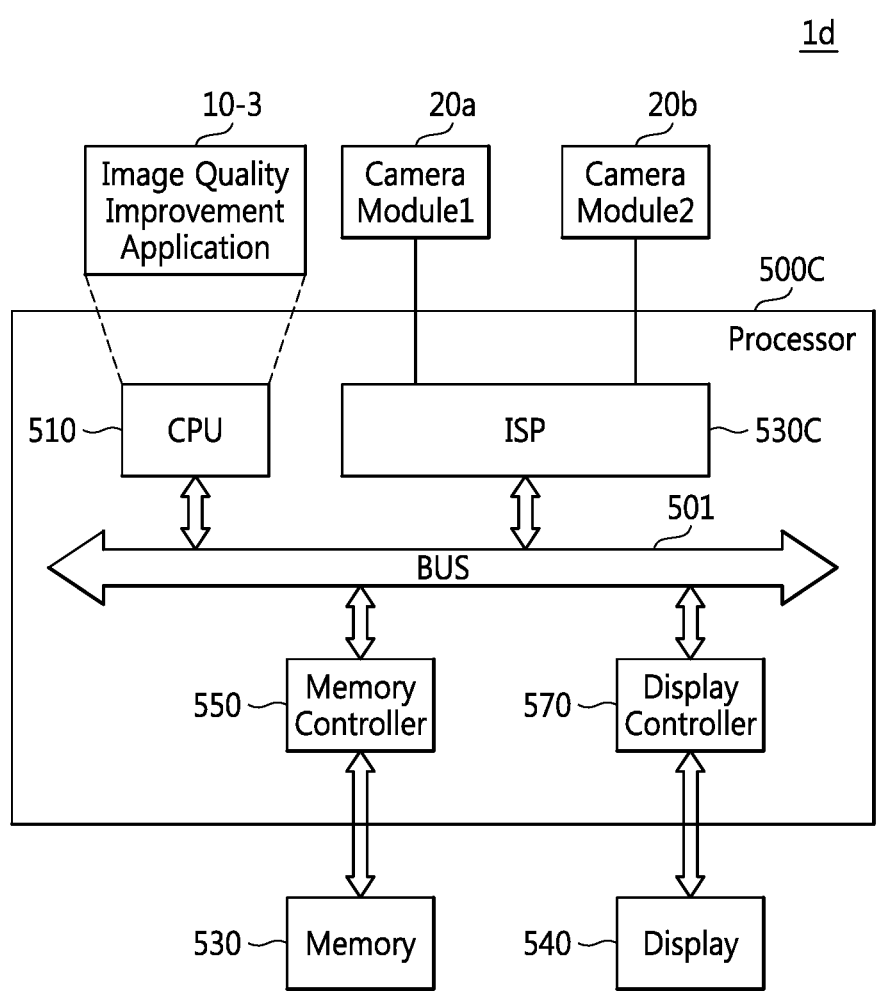
FIG. 11 is a block diagram of an imaging system according to further examples of the inventive concept.

FIG. 11 is a block diagram of an imaging system 1d according to further examples of the inventive concept. Referring to FIG. 11, an image quality improvement application 10-3 may be software or a computer readable program which can be executed in the CPU 510. The image quality improvement application 10-3 may be stored in the external memory 530 and may be loaded to and executed in the CPU 510 when the imaging system 1d is being booted.

The image quality improvement application 10-3 may include a function block which can perform the same function as or a similar function to each of the elements described with reference to FIGS. 1 through 8. Each function block may be embodied as computer readable software or program code.

Figure 12:
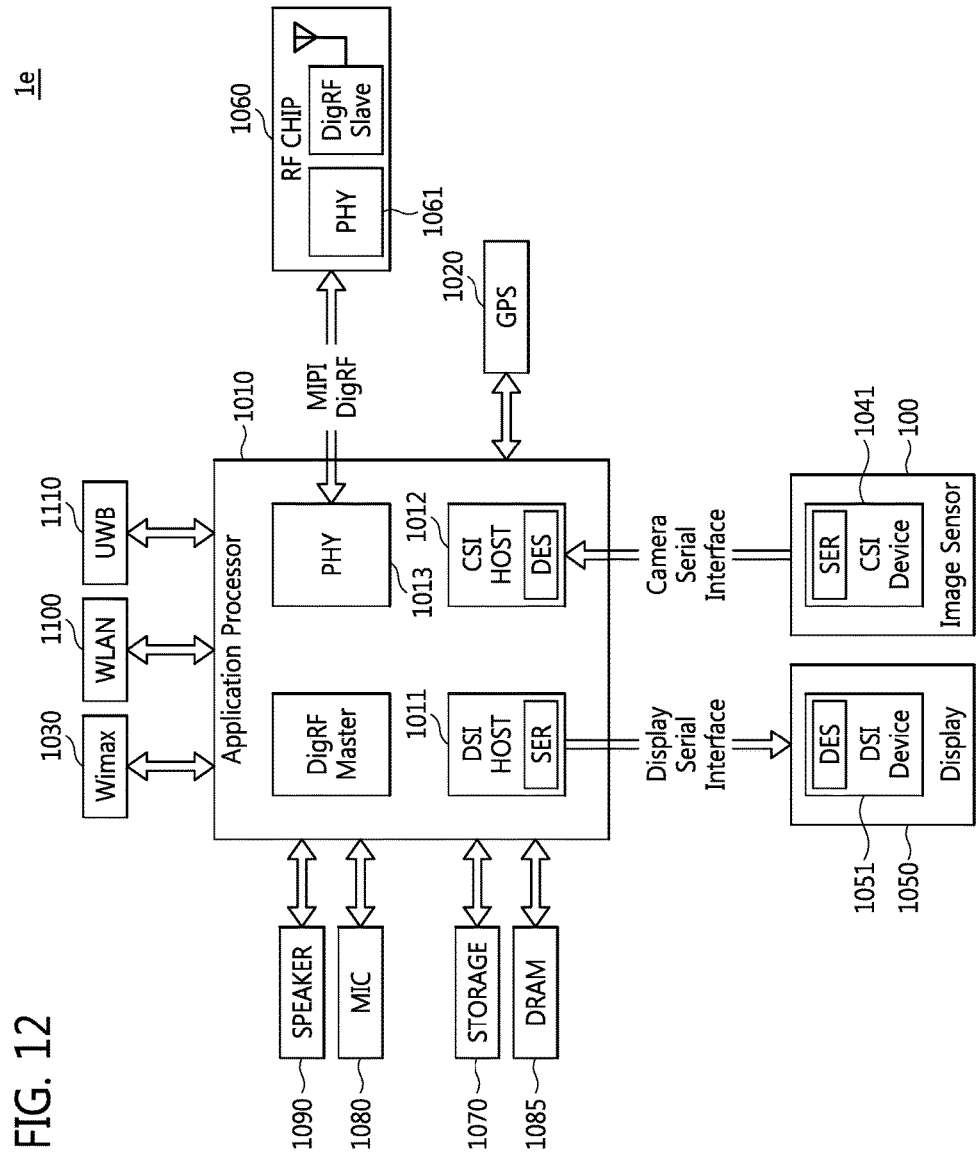
FIG. 12 is a block diagram of an imaging system according to yet other examples of the inventive concept.

FIG. 12 is a block diagram of an imaging system 1e according to yet other examples of the inventive concept. The imaging system 1e may be that of a data processing apparatus, such as a mobile phone, a personal digital assistant (PDA), a portable media player (PMP), an IP TV, or a smart phone that can use or support the MIPI interface. The imaging system 1e includes an application processor 1010, the image sensor 1040, and a display 1050.

A camera serial interface (CSI) host 1012 of the application processor 1010 performs serial communication with a CSI device 1041 of the image sensor 1040 through CSI. For example, an optical de-serializer (DES) may be provided in the CSI host 1012, and an optical serializer (SER) may be provided in the CSI device 1041.

A display serial interface (DSI) host 1011 of the application processor 1010 performs serial communication with a DSI device 1051 of the display 1050 through DSI. For example, an optical serializer may be provided in the DSI host 1011, and an optical de-serializer may be provided in the DSI device 1051.

The imaging system 1e may also include a radio frequency (RF) chip 1060 which communicates with the application processor 1010. A physical layer (PHY) 1013 of the imaging system 1e and a PHY of the RF chip 1060 communicate with (i.e., transmit data to) each other according to a MIPI® DigRF standard.

The imaging system 1e may further include at least one of a GPS 1020, a storage device 1070, a microphone 1080, a DRAM 1085 and a speaker 1290. The imaging system 1e may communicate using Wimax (World Interoperability for Microwave Access) 1030, WLAN (Wireless LAN) 1100 or UWB (Ultra Wideband) 1110, or the like.

The present general inventive concept can also be embodied as computer-readable code on a computer-readable medium. The computer-readable recording medium is any data storage device that can store data as a program which can be thereafter read by a computer system. Examples of computer-readable recording medium include read-only memory (ROM), random-access memory (RAM), CD-ROMs, magnetic tapes, floppy disks, and optical data storage devices. Also, program code for estimating object information may be transmitted in carrier wave (e.g., transmission via the Internet) format.

The computer-readable recording medium can also be distributed over network coupled computer systems so that the computer-readable code is stored and executed in a distributed fashion. Also, functional programs, codes, and code segments to accomplish the present general inventive concept can be easily developed by programmers.

As described above, according to some examples of the inventive concept, an imaging system uses both an RGB image sensor and an RWB image sensor and thus uses images for which distortion of color information is improved even in low-light conditions as well as in high-light conditions, thereby improving the quality of low-light images (images captured in low light conditions). In addition, the imaging system omits a series of processes involving an image generated from one of camera modules, according to the operation mode of the camera modules and an illumination value. Thus, computational complexity is minimized.

Although the inventive concept has been particularly shown and described with reference to examples thereof, it will be understood by those of ordinary skill in the art that various changes in forms and details may be made to the disclosed examples without departing from the spirit and scope of the inventive concept as defined by the following claims.

What is claimed is:

1. A method of operation of a dual camera which includes an RWB image sensor that generates red, white and blue color information of light sensed thereby and an RGB image sensor that generates red, green and blue color information of light sensed thereby, the method comprising:
    producing first image information using the RWB image sensor;
    producing second image information using the RGB image sensor;
    obtaining a measure of luminance in an environment in which the dual camera is operating;
    comparing the measure of luminance with at least one threshold; and
    based a result of the comparing of the measure of luminance with the at least one threshold, deciding which one or ones of the first and second image information to select for processing and producing third image information by processing the image information selected from among the first and second image information.

2. The method of claim 1, wherein the deciding which of the first image information and the second image information to select for processing is is also based on an operation mode of the dual camera under which each of the RWB image sensor and the RGB image sensor are selectively operable.

3. The method of claim 2, wherein the dual camera has still and video modes of operation under which each of the RWB and RGB image sensors are selectively operable,
    an illumination value is obtained as the measure of luminance in the environment in which the dual camera is operating, and the comparing of the measure of luminance with at least one threshold comprises comparing the illumination value with a first threshold, and
    wherein the producing of the third image information comprises:
    using the first image information to produce the third image information when the RWB image sensor and the RGB image sensor are both operating in the still mode and the illumination value is less than the first threshold, and
    using the second image information to produce the third image information when the RWB image sensor and the RGB image sensor are operating under the still mode and the illumination value is equal to or greater than the first threshold.

4. The method of claim 2, wherein the dual camera has a first camera module constituted by the RWB image sensor and a second camera module constituted by the RGB image sensor,
    the dual camera has still and video modes of operation under which each of the RWB and RGB image sensors are selectively operable,
    an illumination value is obtained as the measure of luminance in the environment in which the dual camera is operating, and the comparing of the measure of luminance with at least one threshold comprises comparing the illumination value with a first threshold, and
    the deciding which one or ones of the first and second image information to select for processing comprises turning off the second camera module when the RWB image sensor and the RGB image sensor are both operating under the still mode and the illumination value is less than a first threshold, and turning off the first camera module when the RWB image sensor and the RGB image sensor are both operating under the still mode and the illumination value is equal to or greater than the first threshold.

5. The method of claim 2, wherein the dual camera has a still mode and a video mode under which each of the RWB and RGB image sensors are selectively operable,
    an illumination value is obtained as the measure of luminance in the environment in which the dual camera is operating, and the comparing of the measure of luminance with at least one threshold comprises comparing the illumination value with one threshold and another threshold, and the producing of the third image information comprises
interpolating the first image information and the second
image information when the RWB image sensor and
the RGB image sensor are operating under the video
mode and the illumination value is equal to or greater
than said one threshold and less than said another
threshold.

6. The method of claim 5, wherein the interpolating comprises accessing a lookup table in which interpolation coefficients are correlated with illumination values, and processing the first image information and the second image information using an interpolation coefficient correlated in the lookup table with the illumination value.

7. The method of claim 2, wherein the dual camera has a first camera module constituted by the RWB image sensor and a second camera module constituted by the RGB image sensor,
- the dual camera has a still mode and a video mode under which each of the RWB and RGB image sensors are selectively operable,
- an illumination value is obtained as the measure of luminance in the environment in which the dual camera is operating, and the comparing of the measure of luminance with at least one threshold comprises comparing illumination value with a plurality of thresholds, and
- the deciding which one or ones of the first and second image information to select for processing comprises turning off the second camera module when the RWB image sensor and the RGB image sensor are operating under the video mode and the illumination value is less than one of the thresholds, and turning off the first camera module when the RWB image sensor and the RGB image sensor are operating under the video mode and the illumination value is equal to or greater than another of the thresholds.

8. A method of operation of a dual camera which includes an RWB image sensor that generates red, white and blue color information of light sensed thereby and an RGB image sensor that generates red, green and blue color information of light sensed thereby, the method comprising:
- producing first image information and second image information respectively using the RWB image sensor and the RGB image sensor;
- selecting at least one of the first image information and the second image information in dependence on an operation mode of the dual camera and based at least in part on an illumination value of luminance in an environment of the dual camera; and
- producing third image information using the selected at least one of the first image information and the second image information.

9. The method of claim 8, wherein the dual camera has a still mode and a video mode under which each of the RWB and RGB image sensors are selectively operable, and
the selecting comprises:
- selecting the first image information only among the first and second image information when the RWB image sensor and the RGB image sensor are operating under the still mode and the illumination value is less than a first threshold, and
- selecting the second image information only among the first and second image information when the RWB image sensor and the RGB image sensor are operating under the still mode and the illumination value is equal to or greater than the first threshold.

10. The method of claim 8, wherein the dual camera has a first camera module constituted by the RWB image sensor and a second camera module constituted by the RGB image sensor,
- the dual camera has a still mode and a video mode under which each of the RWB and RGB are selectively operable, and
the selecting comprises:
turning off the second camera module when the RWB image sensor and the RGB image sensor are operating under the still mode and the illumination value is less than a first threshold, and turning off the first camera module when the RWB image sensor and the RGB image sensor are operating under the still mode and the illumination value is equal to or greater than the first threshold.

11. The method of claim 8, wherein the dual camera has a still mode and a video mode under which each of the RWB and RGB image sensors are selectively operable, and
the producing the third image information comprises interpolating the first image information and the second image information when the RWB image sensor and the RGB image sensor are operating under the video mode and the illumination value is equal to or greater than one threshold value and less than another threshold value.

12. The method of claim 11, wherein the interpolating comprises accessing a lookup table of coefficients correlated with illumination values, and selecting from the lookup table a coefficient that is correlated with the illumination value of luminance in the environment of the dual camera.

13. The method of claim 8, wherein the dual camera has a first camera module constituted by the RWB image sensor and a second camera module constituted by the RGB image sensor,
the dual camera has a still mode and a video mode under which each of the RWB and RGB image sensors are selectively operable, and
the selecting comprises:
turning off the second camera module when the RWB image sensor and the RGB image sensor are operating under the video mode and the illumination value is less than one threshold, and
turning off the first camera module when the RWB image sensor and the RGB image sensor are operating under the video mode and the illumination value is equal to or greater than another threshold.

14. An imaging method of a camera system, comprising:
- producing first image information of red, white and blue light in a field of view of the camera system;
- producing second image information, discrete from the first image information, of red, green and blue light in a field of view of the camera system;
- obtaining a measure of luminance in an environment in which the camera system is located;
- comparing the measure of luminance with at least one threshold value;
- generating final image information, wherein the generating of the final image information comprises selectively processing the first and second image information based, at least in part, on a result of the comparing of said measure of the luminance with the at least one threshold value; and
- storing the final image information in a memory and/or displaying the final image information on a display.

15. The method of claim 14, wherein the camera system is selectively operable in a still mode in which the final image information is in the format of a still image and a video mode in which the final image information is in the format of a video, and wherein when the camera system is operated in the still mode, the selective processing comprises allowing the first image information but not the second image information to be output towards the memory and/or the display in the camera system when a value of the luminance is less than a threshold value.

16. The method of claim 14, wherein the camera system is selectively operable in a still mode in which the final image information is in the format of a still image and a video mode in which the final image information is in the format of a video, and wherein when the camera system is operated in the still mode, the selective processing comprises allowing the second image information but not the first image information to be output towards the memory and/or the display in the camera system when a value of the luminance is greater than or equal to a threshold value.

17. The method of claim 14, wherein the camera system is selectively operable in a still mode in which the final image information is in the format of a still image and a video mode in which the final image information is in the format of a video, and wherein when the camera system is operated in the video mode, the selective processing comprises synthesizing the final image information from the first image information and the second image information.

18. The method of claim 14, wherein the camera system is selectively operable in a still mode in which the final image information is in the format of a still image and a video mode in which the final image information is in the format of a video, and wherein the camera system is operated in the video mode, the selective processing comprises allowing the first image information but not the second image information to be output towards the memory and/or the display in the camera system when a value of the luminance is less than a threshold value.

19. The method of claim 14, wherein the camera system is selectively operable in a still mode in which the final image information is in the format of a still image and a video mode in which the final image information is in the format of a video, and wherein when the camera system is operated in the video mode, the selective processing comprises synthesizing the final image information from the first image information and the second image information when a value of the luminance is greater than one threshold value and less than another threshold value.

20. The method of claim 14, wherein the camera system is selectively operable in a still mode in which the final image information is in the format of a still image and a video mode in which the final image information is in the format of a video, and wherein when the camera system is operated in the video mode, the selective processing comprises allowing the second image information but not the first image information to be output towards the memory and/or the display in the camera system when a value of the luminance is equal to or greater than a threshold value.

* * * * *